US006647808B2

(12) United States Patent
Sato et al.

(10) Patent No.: US 6,647,808 B2
(45) Date of Patent: Nov. 18, 2003

(54) POSITION-DETECTING APPARATUS

(75) Inventors: Akio Sato, Soka (JP); Akira Chiyoda, Soka (JP)

(73) Assignee: SMC Kabushiki Kaisha, Tokyo (JP)

(*) Notice: Subject to any disclaimer, the term of this patent is extended or adjusted under 35 U.S.C. 154(b) by 0 days.

(21) Appl. No.: 10/157,242

(22) Filed: May 30, 2002

(65) Prior Publication Data

US 2002/0178838 A1 Dec. 5, 2002

(30) Foreign Application Priority Data

May 31, 2001 (JP) .............................. 2001-165227

(51) Int. Cl.[7] ................................................ G01F 1/44
(52) U.S. Cl. ................................................ 73/861.63
(58) Field of Search ............................ 73/714, 861.63; 33/DIG. 2

(56) References Cited

U.S. PATENT DOCUMENTS 5,586,435 A * 12/1996 Kokalis ...................... 60/416

FOREIGN PATENT DOCUMENTS

JP          4-57708       5/1992
JP       2000-141166      5/2000

OTHER PUBLICATIONS

A translation, in the form of an English language abstract, has been provided for JP 2000–141166, and relevance of this citation is also discussed on p. 2 of the present specification.

An abridged translation of pertinent portions of JP 4–57708 has been provided.

* cited by examiner

Primary Examiner—Harshad Patel
(74) Attorney, Agent, or Firm—Paul A. Guss

(57) ABSTRACT

An air is fed from an air supply source to a detecting nozzle via a first fixed throttle section. The air is jetted from the detecting nozzle to the workpiece W to obtain a nozzle back pressure for detecting a position of a workpiece W. A first diffuser section is disposed downstream of the first fixed throttle section.

6 Claims, 5 Drawing Sheets

PRIOR ART

PRIOR ART

POSITION-DETECTING APPARATUS

BACKGROUND OF THE INVENTION

1. Field of the Invention

The present invention relates to a position-detecting apparatus for detecting a position of an object. Specifically, the present invention relates to a position-detecting apparatus for supplying a fluid from a fluid supply source to a nozzle via an upstream fixed throttle section and jetting the supplied fluid from an end of the nozzle to the object, thereby obtaining a nozzle back pressure.

2. Description of the Related Art

A known position-detecting apparatus generally has a nozzle flapper mechanism or the like utilizing the nozzle back pressure for detecting a position of a workpiece. Such a position-detecting apparatus is shown in FIG. 4. An air passage 2 and a comparing air passage 3 are communicated with an air supply source (fluid supply source) 1. Fixed throttles 4, 5 are disposed in the air passage 2 and the comparing air passage 3.

A detecting nozzle 6 is provided at the end of the air passage 2. The comparing air passage 3 is externally open via a comparing throttle 7 composed of a variable throttle. A differential pressure detector 8 is connected integrally to the air passage 2 and the comparing air passage 3. The differential pressure detector 8 comprises, for example, a diaphragm which is provided in a diaphragm chamber communicating with the air passage 2 and the comparing air passage 3, and a proximity switch which is operated by deformation of the diaphragm (see, for example, Japanese Laid-Open Patent Publication No. 2000-141166).

The air is derived from the air supply source 1 and is branched to flow through the air passage 2 and the comparing air passage 3. The air is supplied to the detecting nozzle 6 and the comparing nozzle 7 via the fixed throttles 4, 5.

The end of the detecting nozzle 6 confronts a surface 9 of an object. The air is jetted toward the surface 9 from the end of the detecting nozzle 6. A nozzle back pressure generates corresponding to the gap between the end of the detecting nozzle 6 and the surface 9. A comparing air pressure generated in the comparing air passage 3 and the nozzle back pressure are introduced into the differential pressure detector 8. It is detected whether or not the surface 9 is located at a predetermined position based upon an obtained result of the detection performed by the differential pressure detector 8.

Another position-detecting apparatus is shown in FIG. 5. An air passage 2a is connected to an air supply source 1a. A fixed throttle 4a is disposed upstream of the air passage 2a. A detecting nozzle 6a is connected to the end of the air passage 2a. A pressure detector 8a for detecting the nozzle back pressure is disposed between the detecting nozzle 6a and the fixed throttle 4a.

The air is derived from the air supply source 1a and is fed from the fixed throttle 4a to the detecting nozzle 6a. The air is jetted to a surface 9a of an object from the end of the detecting nozzle 6a. A nozzle back pressure generates corresponding to the distance between the end of the detecting nozzle 6a and the surface 9a. The pressure detector 8a detects the nozzle back pressure, thereby detecting the distance between the end of the detecting nozzle 6a and the surface 9a, i.e., whether or not the surface 9a is located at a predetermined position.

Conventionally, the nozzle back pressure can be accurately detected when the end of the detecting nozzle 6, 6a is considerably near the surface 9, 9a. However, no correct nozzle back pressure can be obtained at a position at which the end of the detecting nozzle 6, 6a is relatively spaced from the surface 9, 9a. Therefore, the accuracy of detecting the position of the surface 9, 9a is low.

SUMMARY OF THE INVENTION

It is a general object of the present invention to provide a simple position-detecting apparatus which effectively improves an accuracy of detecting a position of a workpiece.

According to the present invention, a fluid is fed from a fluid supply source to a nozzle via a fixed throttle section and is jetted from an end of the nozzle to the object. A nozzle back pressure is thus obtained to detect a position of the object. A diffuser section is disposed downstream of the fixed throttle section.

The fluid supplied to the nozzle via the diffuser section is subjected to energy conversion to be a high pressure fluid, the high pressure fluid being jetted to the object. Therefore, even when the distance (detection position) between the end of the nozzle and the object is relatively large, it is possible to reliably suppress the fluctuation of the nozzle back pressure. It is possible to effectively improve the accuracy of detecting the position of the object with the simple arrangement.

The position-detecting apparatus further comprises a comparing fluid passage. The comparing fluid passage is continuous to the outside of the apparatus from the fluid supply source via another fixed throttle section and which introduces a comparative pressure into a differential pressure detector into which the nozzle back pressure is introduced. The comparing fluid passage has another diffuser section disposed downstream of the fixed throttle section. Accordingly, it is possible to detect the pressure fluctuation in the comparing fluid passage easily and reliably. Further, the differential pressure detector makes it possible to highly accurately detect the position of the object.

The diffuser section is a fluid passage which integrally has a diameter-decreasing section, a straight pipe section, and a diameter-increasing section. Therefore, the arrangement of the diffuser section is simplified, and the desired energy conversion is reliably performed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
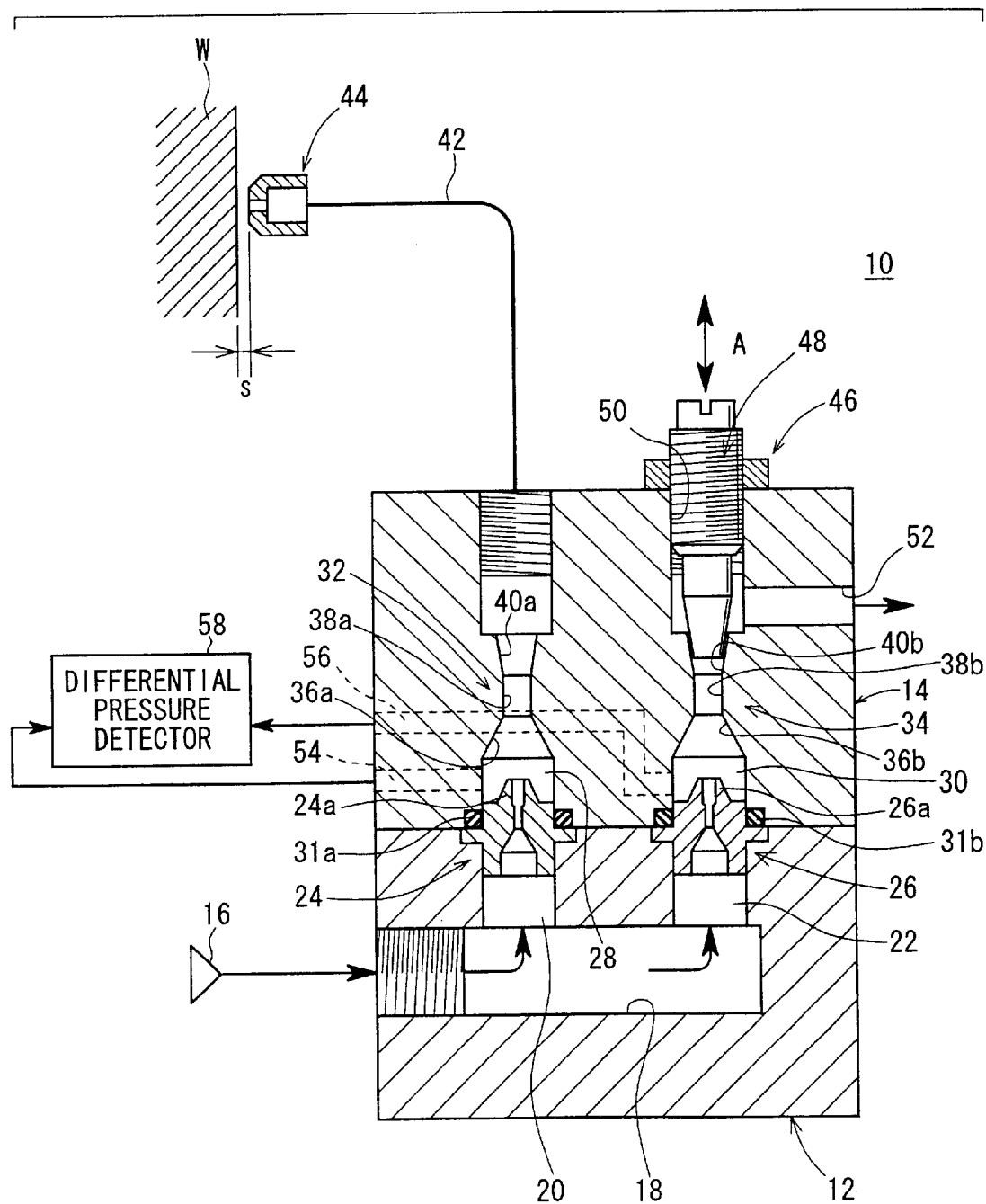
FIG. 1 illustrates, with partial cross section, an arrangement of a position-detecting apparatus according to a first embodiment of the present invention.

As shown in FIG. 1, a position-detecting apparatus 10 according to a first embodiment of the present invention comprises a first main body section 12 and a second main body section 14 which are joined to one another. The first main body section 12 has a supply passage 18 which is communicated with an air supply source (fluid supply source) 16. The supply passage 18 is branched into a detecting fluid passage 20 and a comparing fluid passage 22.

A first fixed throttle section 24 and a second fixed throttle section 26 are installed to the detecting fluid passage 20 and the comparing fluid passage 22. The ends 24*a*, 26*a* of the first and second fixed throttle sections 24, 26 are inserted into a detecting fluid passage 28 and a comparing fluid passage 30 formed in the second main body section 14 by using O-rings 31*a*, 31*b*. The detecting fluid passage 28 and the comparing fluid passage 30 are coaxial with the detecting fluid passage 20 and the comparing fluid passage 22.

First and second diffuser sections 32, 34 are coaxially disposed downstream of the detecting fluid passage 28 and the comparing fluid passage 30. Each of the first and second diffuser sections 32, 34 is a fluid passage which integrally has a diameter-decreasing section 36*a*, 36*b*, a straight pipe section 38*a*, 38*b*, and a diameter-increasing section 40*a*, 40*b* which are disposed in this order in the direction of flow.

A detecting nozzle 44 is communicated via a tube member 42 downstream of the diameter-increasing section 40*a*. A variable throttle section 46 is disposed downstream of the diameter-increasing section 40*b*. The variable throttle section 46 has a setup needle 48. The setup needle 48 is screwed into a screw hole 50 formed in the second main body section 14. The position of the setup needle 48 is adjustable in the direction of the arrow A, thereby adjusting the throttle of the variable throttle section 46. A discharge hole 52 for externally discharging the air is communicated with the variable throttle section 46.

The second main body section 14 has a detected pressure passage 54 communicated with the detecting fluid passage 28, and a comparative pressure passage 56 communicated with the comparing fluid passage 30. A differential pressure detector 58 is connected to the detected pressure passage 54 and the comparative pressure passage 56. Although not shown, the differential pressure detector 58 has a diaphragm and a proximity switch. The differential pressure detector 58 detects that a workpiece W arrives at a desired position when the detected pressure of the detected pressure passage 54 exceeds the comparative pressure of the comparative pressure passage 56. At this time, the differential pressure detector 58 lights a lamp, for example.

Operation of the position-detecting apparatus 10 will be explained below.

The air is supplied from the air supply source 16 to the supply passage 18 and is branched to flow through the detecting fluid passage 20 and the comparing fluid passage 22 which are communicated with the supply passage 18. The air, which has been introduced into the detecting fluid passage 20 and the comparing fluid passage 22, is throttled by the first and second fixed throttle sections 24, 26. Then, the air is introduced into the first and second diffuser sections 32, 34.

The air, which has been introduced into the first diffuser section 32, is fed to the detecting nozzle 44 via the tube member 42. The detecting nozzle 44 is disposed at a position spaced from the seat surface of the workpiece W (object) by a predetermined detection distance S. The air is jetted from the detecting nozzle 44 toward the workpiece W. The nozzle back pressure is introduced into the differential pressure detector 58 via the detected pressure passage 54.

By contrast, the air, which has been introduced into the second diffuser section 34, is throttled by the variable throttle section 46 and is discharged from the discharge hole 52. A predetermined comparative pressure is introduced into the differential pressure detector 58 via the comparative pressure passage 56. The differential pressure detector 58 detects whether or not the workpiece W is correctly seated on the predetermined seat surface based upon the nozzle back pressure detected from the detecting nozzle 44 and the comparative pressure introduced from the comparing fluid passage 30.

The position-detecting apparatus 10 of the first embodiment feeds the air from the air supply source 16 via the first fixed throttle section 24 to the detecting nozzle 44 and jets the fed air to the workpiece W, thereby obtaining the nozzle back pressure. The position-detecting apparatus 10 has the first diffuser section 32 downstream of the first fixed throttle section 24. The air is fed from the first fixed throttle section 24 to the detecting fluid passage 28 and is subjected to energy conversion to be high pressure air. The high pressure air is jetted from the detecting nozzle 44 to the workpiece W.

Therefore, even when the detection distance S between the seat surface of the workpiece W and the detecting nozzle 44 is relatively large, it is possible to obtain the highly accurate nozzle back pressure. The accuracy of detecting the position of the workpiece W is effectively improved.

Figure 2:
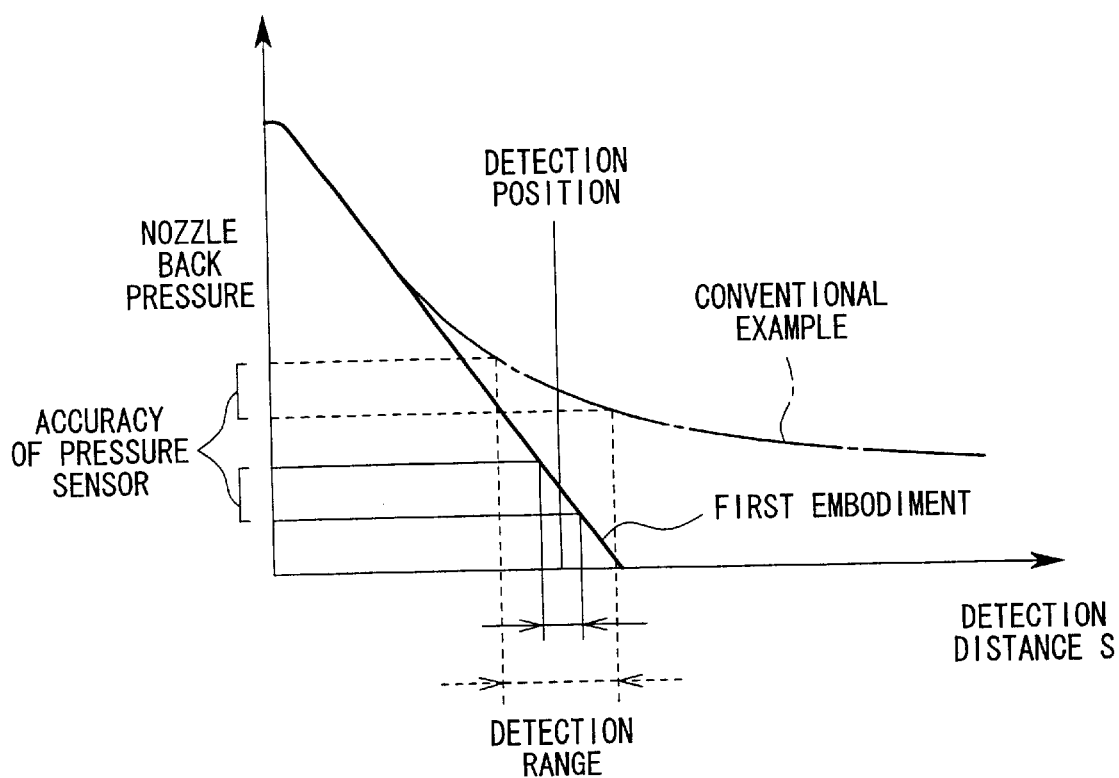
FIG. 2 illustrates comparison for the detection position and the nozzle back pressure between a conventional position-detecting apparatus and the position-detecting apparatus according to the first embodiment.

FIG. 2 shows results of detection of the nozzle back pressure at predetermined detection positions by using a conventional position-detecting apparatus having no diffuser section and the position-detecting apparatus 10 according to the first embodiment.

In FIG. 2, the accuracy of detecting the nozzle back pressure is conventionally lowered as the detection distance S is increased. The detection range is large for the predetermined detection positions. By contrast, in the first embodiment, even when the detection distance S is increased, the nozzle back pressure is varied linearly. The detection accuracy is not decreased, and the detection range for the predetermined detection positions is considerably small. Therefore, the first diffuser section 32 makes it unnecessary to improve the accuracy of the differential pressure detector 58, and the position-detecting apparatus 10 detects the position of the workpiece W with improved accuracy and efficiency.

The position-detecting apparatus 10 also comprises the second diffuser section 34 which is provided for the comparing fluid passage 30. Therefore, the desired comparative pressure is reliably fed to the differential pressure detector 58, enabling the position-detecting apparatus 10 to detect the position of the workpiece W with more reliable accuracy.

Figure 3:
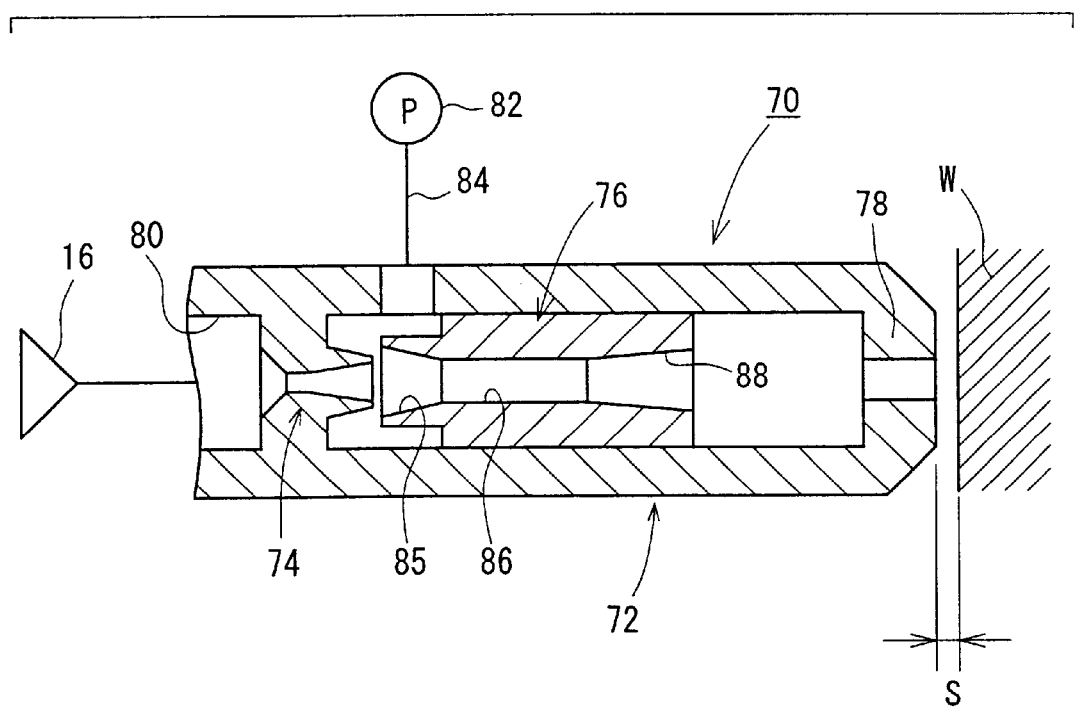
FIG. 3 illustrates, with partial cross section, a position-detecting apparatus according to a second embodiment of the present invention.
Figure 4:
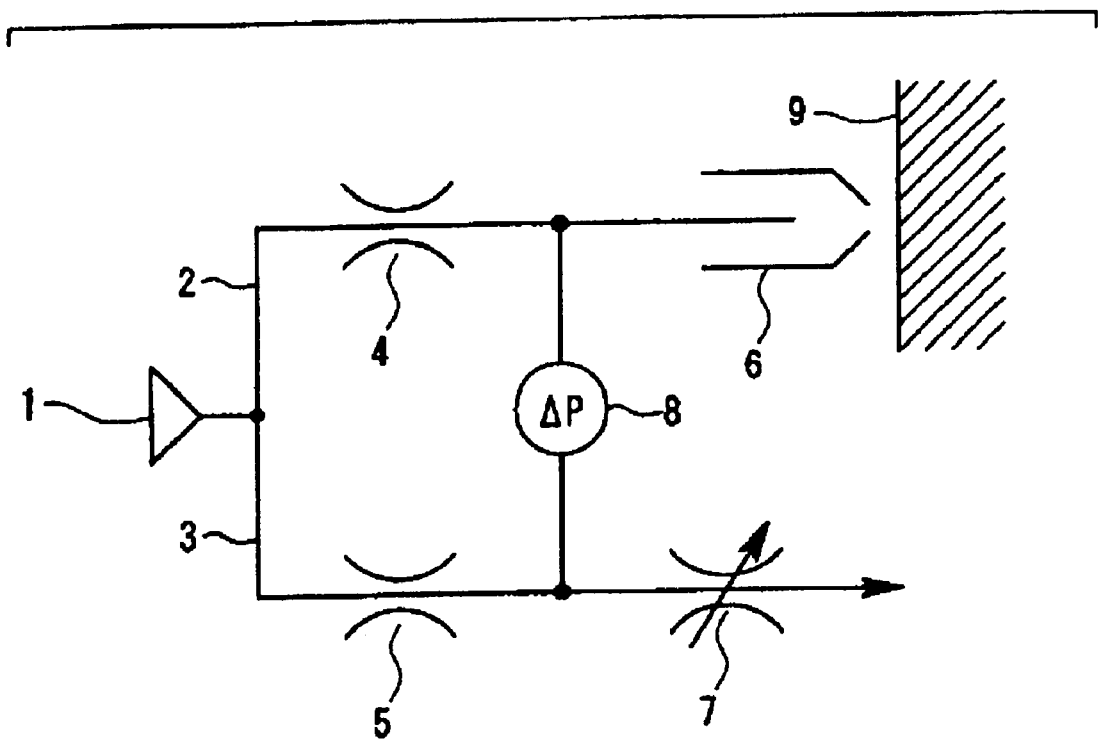
FIG. 4 illustrates a schematic arrangement of a conventional position-detecting apparatus.
Figure 5:
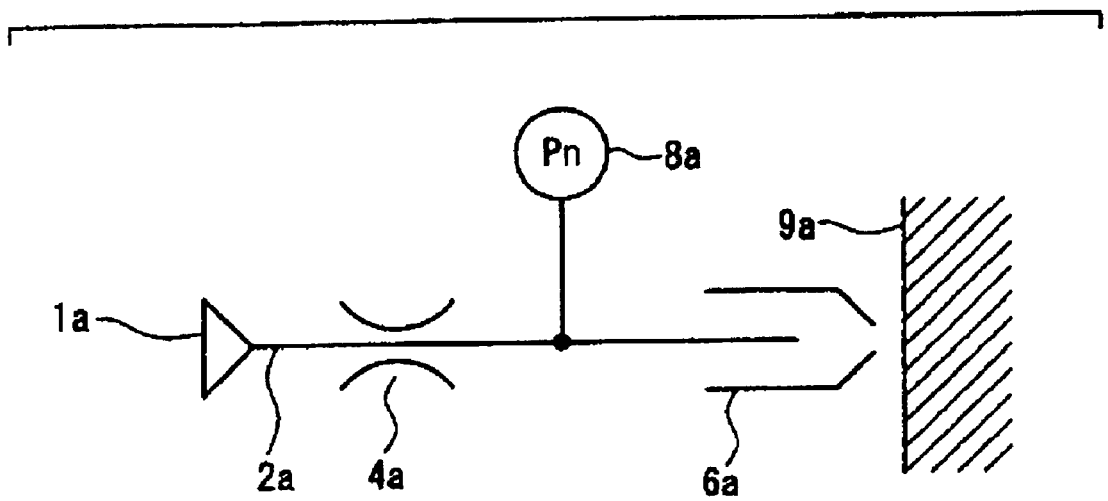
FIG. 5 illustrates a schematic arrangement of another conventional position-detecting apparatus.

A position-detecting apparatus 70 according to a second embodiment of the present invention is shown in FIG. 3.

The position-detecting apparatus 70 has a substantially cylindrical main body section 72. A fixed throttle section 74, a diffuser section 76, and a nozzle section 78 are coaxially disposed in the main body section 72. A detecting fluid passage 80 is communicated from an air supply source 16 to the fixed throttle section 74. A detected pressure passage 84, which is communicated with a pressure sensor 82, is disposed downstream of the fixed throttle section 74. The diffuser section 76 is a fluid passage which integrally has a diameter-decreasing section 85, a straight pipe section 86, and a diameter-increasing section 88 which are disposed in this order in the direction in which the air flows.

The position-detecting apparatus 70 is operated as follows. The air is supplied from the air supply source 16 via the detecting fluid passage 80 to the fixed throttle section 74 and is throttled by the fixed throttle section 74. Then, the air is introduced into the diffuser section 76 and is jetted toward a workpiece W from the end of the nozzle section 78. The pressure sensor 82 detects the nozzle back pressure, thereby detecting the detection distance S between the workpiece W and the nozzle section 78.

In the second embodiment, the diffuser section 76 is disposed downstream of the fixed throttle section 74. The air jetted from the nozzle section 78 is a high pressure air. Therefore, even when the detection distance S is relatively large, the nozzle back pressure is correctly detected, and the accuracy of detecting the position is effectively improved.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A position-detecting apparatus for detecting a position of an object by supplying a fluid from a fluid supply source to a nozzle via a fixed throttle section and by jetting said supplied fluid from an end of said nozzle to said object for obtaining a nozzle back pressure, wherein a diffuser section is disposed downstream of said fixed throttle section.

2. The position-detecting apparatus according to claim 1, further comprising a comparing fluid passage which is continuous to the outside of said position-detecting apparatus from said fluid supply source via another fixed throttle section and which introduces a comparative pressure into a differential pressure detector into which said nozzle back pressure is introduced, wherein said comparing fluid passage has another diffuser section disposed downstream of said other fixed throttle section.

3. The position-detecting apparatus according to claim 1, wherein said diffuser section is a fluid passage integrally having a diameter-decreasing section, a straight pipe section, and a diameter-increasing section which are disposed toward said nozzle in an order of said diameter-decreasing section, said straight pipe section, and said diameter-increasing section.

4. The position-detecting apparatus according to claim 2, wherein said other diffuser section is a fluid passage integrally having a diameter-decreasing section, a straight pipe section, and a diameter-increasing section which are disposed toward a discharge outlet in an order of said diameter-decreasing section, said straight pipe section, and said diameter-increasing section.

5. The position-detecting apparatus according to claim 2, wherein said position-detecting apparatus has a first main body section and a second main body section which are independent of and joined to one another;

said fixed throttle section is disposed in a detecting fluid passage and said other fixed throttle section is disposed in a comparing fluid passage;

a plane surface on which said first main body section and said second main body section are joined to one another extends through said fixed throttle section and said other fixed throttle section; and said diffuser section and said other diffuser section are juxtaposed downstream of said fixed throttle section and said other fixed throttle section.

6. A position-detecting apparatus for detecting a position of an object by supplying a fluid from a fluid supply source to a nozzle via a fixed throttle section and by jetting said supplied fluid from an end of said nozzle to said object for obtaining a nozzle back pressure, wherein said position-detecting apparatus has a cylindrical main body section, and a fixed throttle section, a diffuser section, and a nozzle are coaxially disposed in said main body section.

* * * * *